United States Patent Office 3,510,441
Patented May 5, 1970

3,510,441
VINYL CHLORIDE POLYMERS STABILIZED WITH MIXTURES CONTAINING A METAL SALT, PHOSPHITE, PHENOL AND THIODIPROPIONATE
Elwood E. Huntzinger, Springfield, Pa., assignor to Air Products and Chemicals Inc., Philadelphia, Pa., a corporation of Delaware
No Drawing. Filed Feb. 4, 1966, Ser. No. 525,100
Int. Cl. C08f 45/58, 45/62
U.S. Cl. 260—23                                4 Claims

ABSTRACT OF THE DISCLOSURE

Conventional polyvinyl chloride skins contacting polyurethane foam tend to discolor when exposed to ultraviolet light, the amine catalyst of the polyurethane apparently migrating into and overcoming the effect of conventional stabilizers. A stabilizer additive including four components, a phosphite ester, a salt of a Group II metal, a hindered phenol, and dilauryl thiodipropionate imparts light stability to the polyvinyl skin contacting the amine-catalyzed polyurethane.

---

This invention is concerned with the stabilization of vinyl chloride polymer films against degradation of the type induced by exposure to light and heat. More particularly, this invention is directed to the stabilization of vinyl chloride homo- and copolymer films in contact with urethane foam, especially amine catalyzed urethane foam.

It is well known that poly(vinyl chloride) materials when properly prepared have physical properties of resistance to abrasion along with intrinsic strength and flexibility characteristics which make them highly suited for uses under conditions involving abrasion and flexing. One of the very desirable fields of use is that of upholstery type cover material. Such material can have desirably attractive characteristics including a hand equivalent to that of the finest natural leathers when backed with a suitable polymeric flexible foam. For uses such as in the automobile industry in the padding of arm rests, dash boards, sun visors and the like, the poly(vinyl chloride) film makes an excellent sturdy cover material for a firm polyurethane foam padding.

Over the years the plastics industry through much trial and error and the application of scientific principles has developed vinyl chloride polymer formulations, including various stabilizers, having outstanding physical characteristics including resistance to heat and light degradation under a wide variety of conditions.

Four major classes of stabilizers are recognized for general or special uses in vinyl polymer formulations:

(1) Inorganic acid drivatives. These are generally considered in separate subgroups identified as (a) lead stabilizers and (b) non-lead stabilizers. The lead salts are known to be subject to the serious drawback of staining by sulfides.

(2) Metal salts and metal complexes of organic acids. These include alkaline earth salts of fatty acids (soaps) and of other aliphatic and aromatic carboxylic acids as well as zinc, cadmium and tin salts of these acids in various combinations with the alkaline earth soaps or complexes. The familiar proprietary liquid stabilizer complexes such as "Barium-cadmium complex" and "Barium-zinc complex" are formed from mixed or coprecipitated fatty acid soaps, naphthenates (and sometimes alkyl phenoxides) or other compounds of these metals associated with an organic liquid which may in itself serve as a chelator, as is the case, for example, when the organic liquid comprises mono and/or di-alkyl phosphites or the mono and/or di-aryl phosphites. In some instances the organic liquid is said to form a complex with the metal compounds.

(3) Organo-metallic stabilizers include chiefly alkyl tin compounds.

(4) Organic stabilizers. Included in this category are also the organic phosphites, including mono-, di- and trialkyl as well as mono-, di- and triaryl phosphites. These organic phosphites may serve as chelators or "boosters" and certain of these also function in part as anti-oxidants. Certain liquid proprietary stabilizers, sometimes designated as "phosphite," include metal stabilizer in the form of a polyvalent metal soap and/or alkaline earth metal soap dispersed in organic phosphite; in some instances zinc soaps are also included for protection against sulfide darkening. Also included are materials which may serve as secondary plasticizers, for example, epoxidized oils and fatty acid esters.

Known formulations for halogen-containing vinyl resins often contain several stabilizers from among the several classes outlined above to provide heat and light stability and to some extent resistance to plating out.

However, it was found that none of the available stabilizing formulations was adequately effective in stabilization of vinyl chloride polymers when used in contact with polyurethane foams which had been prepared from formulations including the use of tertiary amine catalysts. Degradation effects produced by heat and light in the vinyl chloride polymers are aggravated under these conditions of proximity of such polyurethane foams to the extent that none of the available stabilizing materials, of which the number is legion, either alone or in any known combination provided stabilizing effects adequate to meet the needs of industry.

I have now discovered that not only adequate but superior stabilization can be obtained. Vinyl chloride homo- and copolymer films incorporating materials of the nature and in the amount hereinafter set forth are effectively stabilized against the degrading effects of heat and/or light even in contact with polyurethane foam material catalyzed by any of the known effective tertiary amine type catalysts.

In accordance with this invention, vinyl chloride polymers are stabilized against discoloration and physical breakdown even in contact with amine catalyzed polyurethane compositions by incorporating in the vinyl formulation a stabilizer composition containing one or more organic phosphites, an alkaline earth metal compound, and a hindered phenolic compound to which preferentially there is also added a thiodipropionate disubstituted by alkyl group each of which alkyl group has at least 12 carbon atoms in the alkyl chain. The stabilizing composition is present in an amount ranging from about 2 to 10 phr. (phr.=parts by weight per hundred parts of vinyl resin component). The organic phosphite constitutes 0.5 to 3 phr., the hindered phenolic compound 0.2 to 2.0 phr.; the alkaline earth metal salt or other alkaline earth metal compound may be from 0.3 to 3.0 phr. and the total metal compounds including zinc compounds in the stabilizer composition may be from 0.5 to 5.5 phr. The thiodipropionate desirably is present in an amount in the range of 0.1 to 0.5 phr.

The organic phosphite is selected from among those phosphites ordinarily employed as chelators in vinyl resin compositions, this class including principally tri- and di-alkyl phosphites having 4 to 18 carbon atoms in each alkyl chain, tri- and diaryl phosphites and alkaryl phosphites in which the alkyl group may have 2 to 10 carbon atoms. Examples of these include: triphenyl phosphite, tri(p-tertiary butyl phenyl) phosphite, diphenyl monobutyl phosphite, phenyl dioctyl phosphite, trioctyl phosphite, diphenyl n-decyl phosphite.

The alkaline earth metal compound is preferably in the form of a barium or calcium salt of a higher fatty acid (of 8 to 18 carbon atoms) or a phenolate; in some instances the alkaline earth compound is converted to phosphite or associated in solution or organic complex with the organic phosphite. The zinc soap or compound likewise may be associated with any of the carboxy or other anions mentioned in connection with the alkaline earth salts of compounds and may be the same or different anion than of the alkaline earth component. To provide organic phosphite and metal compounds, at least in part, there may be employed the known commercial products sold as complex vinyl stabilizers, composed of a metal salt of a monocarboxylic acid or a metal phenolate or a mixture of these associated with an organic phosphite. To such commercial complex for the purposes of the present invention there may be added more organic phosphite to provide the desired amount of chelator if not already present in sufficient amount. Example of known commercial complex stabilizers is "Nuostabe V-983" which comprises calcium and zinc metal compounds associated with organic phosphite.

Accordingly the alkaline earth metal compound and the zinc compound severally may be present in the stabilizer composition as an acrylate, for example, laurate, myristate, oleate, stearate, hydroxystearate, naphthenate; as a phenoxide or alcoholate for example as cresoxide or derivative of iso-octyl alcohol.

The hindered phenolic compound is composed of an alkyl or aralkyl phenol. Preferred are phenolic compounds having at least one alkyl group adjacent to hydroxyl; the other ortho position may be occupied by hydrogen or by alkyl or other non-functional substituent. Examples of these include 2,6-di-t-butyl-para cresol; 4,4-methylene bis-(2,6-di-t-butyl phenol); 2,2-bis-(p-hydroxy phenyl) propane, [bisphenol A]; and bis-(3,5-di-iso-propyl-4-hydroxy phenyl) methane; pentaerythritol, as a polyhydroxylic compound with steric hindrance, can be regarded as a "hindered phenol" and can be employed for this purpose.

Discoloration of vinyl compounds in contact with amine catalyzed urethane foam is a known phenomenon. Without being held to the accuracy of the assumption it is believed that the amine in the polyurethane in some way also catalyzes the dehydrochlorination reaction of the vinyl chloride polymer and thus initiates the degradation of the polymer. In any event, degradation of the vinyl polymer can be markedly reduced when the formulation includes the ingredients of the type and in the quantity above described.

While it has been well known in the past that heat stabilizers comprising lead compounds or cadmium compounds are very effective, such materials are completely unsatisfactory in systems in which there is a possibility of contact with sulfur. Since they are very sensitive to sulfur and produce unacceptable sulfide stainable products the field of use is limited and does not include products for automotive utilization. For instance, dibasic lead phthalate, or the stearate, or the phosphite, are effective heat stabilizers in the absence of sulfiding conditions but are not acceptable or practical in stabilization against amine staining in normal exposure conditions. Organic tin compounds are not successful stabilizers for the vinyl films and actually seem to degrade polyurethane foam with resultant increase in discoloration. A variety of other systems are completely unsatisfactory, such as the addition of acid and acid formers or decomposable ammonia salts of organic acids.

A better understanding of the formulations and the use thereof can be had through reference to the following data which, for the sake of convenience, is tabulated with the point of reference being the "percent reflectance" value. This is the value obtained on the test samples after accelerated aging tests, involving heating of white vinyl chloride polymer film in contact with polyprethane foam at the indicated times and temperatures with the comparison 100% reflecance value corresponding to the whiteness of the vinyl specimen prior to exposure to the stain test. A minimum acceptable percentage value of 50% is an arbitrary minimum value after 46 hours aging at 250° F. which is customarily employed by industry.

In considering the over-all aspects of this invention it should be understood there are many variations possible in vinyl chloride formulations. This invention, per se, is directed to effective additives to such formulations rather than to the formulations themselves. However it can be noted that most of the practical formulations include a type of ingredient effecting some degree of plasticizing and some degree of stabilizing the final polymer. This ingredient is usually an epoxidized oil, such as epoxidized polyesters or natural oils of which epoxidized soybean oil is a typical example. While such an ingredient may be employed in an amount up to about 100 phr. it is more commonly employed in smaller proportions such as about 5 to 10 phr. Thus such an ingredient acts to perform several functions such as a partial stabilizer, a plasticizer, a hydrogen chloride acceptor, and possibly to enhance the activity of metal soaps. In the present invention such epoxidized oils are to be considered as part of the vinyl chloride formulations.

In Examples I and II, below, the same fundamental resin recipe was employed. The formulation was as follows:

| | Parts (weight) |
|---|---|
| Vinyl chloride homopolymer (Geon 121) | 100 |
| Dioctyl phthalate (di-2-ethylhexyl phthalate) | 60 |
| Epoxidized soybean oil (Paraplex G-62) | 5 |
| $TiO_2$, whitening agent (R-610) | 10 |

The amount of the various stabilizers added to this recipe is reported as parts per hundred of resin, i.e. of the vinyl chloride homopolymer.

It is to be understood that this is a recipe embodying typical materials in typical amounts. However, this invention is not limited to the use of this particular basic recipe but is adaptable to usual, normally employed formulations with effective, although not necessarily identical results.

In practice, samples prepared from the above recipe along with described particular additive material were compression molded for five minutes at 325° F. under about 10,000 p.s.i.g. to produce a film of about 60 mils thickness. Such films were tested for discoloration by placing on their surface a weighted-down polyurethane foam which had been prepared with an amine-type catalyst, such as triethylene diamine or dimethyl ethanol amine. It can be noted that no difference in the tabulated results could be attributed to the particular polyurethane catalyst. The poly(vinyl chloride) film plus the polyurethane foam were heated for the indicated times and temperatures in an oven with circulating air. After this accelerated aging, the vinyl samples were measured in a standard reflectance system.

EXAMPLE I

| | Additive | Phr. | Percent reflectance 46 hr. at 250° F. | 64 hr. at 250° F |
|---|---|---|---|---|
| A | None | 0 | Black | |
| B | Dibasic lead phosphite | 5 | 70 | |
|   | Dibasic lead stearate | 1 | | |
| C | Ba-Cd-Zn-phosphite | 2 (4) | 43 (40) | 38 |
|   | Calcium stearate | 1 (2) | | |
| D | Ba-Zn-phosphite | 4 | | 24 |
|   | Phosphite chelator | 1 | | |
| E | Calcium-Zn-phosphite (Nuostabe V-983) | 4 | 61 | 49 |
|   | Phosphite chelator (Nuostabe V-142) | 1 | | |

These data illustrate the need for stabilizer, the improvement from the use of stabilizers of several standard types and the better nature of the non-sulfide staining alkaline earth metal phosphite in conjunction with the phosphite chelator. The results with the lead-containing stabilizer were good in the absence of sulfur; however, almost instantaneous darkening of such sample results from the introduction of trace amounts of sulfide ($H_2S$) to the oven atmosphere.

In the following Example II each of the samples was prepared from the basic recipe, the additive of E above, and the further addition as "additive" of a variety of materials of the type and in the amounts shown.

EXAMPLE II

| Additive | Phr. | Percent reflectance 46 hr. at 250° F. | Percent reflectance 66 hr. at 250° F. |
|---|---|---|---|
| None | 0 | 61 | 49 |
| Di tert.butyl para cresol | 1.0 | 63 | 53 |
| Do | 0.5 | 58 | |
| 4,4 methylene bis(2,6-di-tert.butyl phenol) | 1.0 | | 49 |
| Do | 0.5 | | 51 |
| Pentaerythritol | 1.0 | | 56.5 |
| Do | 0.5 | | 53.5 |
| Bisphenol A [2,2 bis (p hydroxy phenyl)propane] | 1.0 | | 56.0 |
| Do | 0.5 | 63.5 | 57 |
| Dilaurylthiodipropionate | 1.0 | 58.5 | |
| Do | 0.5 | 60.0 | |
| Tri(mixed mono-dinonyl) phenyl phosphite | 1.0 | 57.5 | |
| Do | 0.5 | 59.5 | |
| Bisphenol A | 0.5 | 67.5 | |
| Dilaurylthiodipropionate | 0.5 | | |
| Bisphenol A | 0.67 | 72 | |
| Dilaurylthiodipropionate | 0.33 | | |

The addition of the phenolic compound effects a further improvement in the stabilization effect. This effect is further enhanced by the addition of the thiodipropionate.

It is of particular interest to note that the cumulative effect of combining the phenolic material and the thiodipropionate material is unexpectedly beneficial. This synergism is exemplified in the above data where at the 1.0 phr. level bisphenol A gave an improvement of 7 reflectance units over the control and the dilaurylthiodipropionate at the 1.0 phr. level gave no improvement over the control. These materials in combination showed an improvement of 11 reflectance units.

EXAMPLE III

A resin recipe formulation, as follows is

Parts by weight
Vinyl chloride homopolymer _____ 100
Di-2-ethyl-hexyl phthalate _____ 30
n-Octyl n-decyl adipate _____ 30
Epoxidized soybean oil _____ 10
$CaCO_3$ (whitening agent) _____ 5
$TiO_2$ (whitening agent) _____ 5

To this formulation is added, in the amounts indicated as parts per hundred of the formulation, the following Phr.
Calcium-Zn-phosphite _____ 4
Phosphite chelator _____ 1
Bisphenol A _____ 0.67
Dilaurylthiodipropionate _____ 0.33

The mixture is cured in film form and subjected to the stain test as described above. After heating for 46 hours at 250° F. the reflectance value is 68%.

EXAMPLE IV

A resin recipe formulation is prepared with the following components

Parts by weight
Vinyl chloride homopolymer _____ 100
Butyl benzyl phthalate _____ 30
Di-2-ethyl-hexyl adipate _____ 30
Epoxidized soybean oil _____ 5
$CaCO_3$ (whitening agent) _____ 10

To this formulation is admixed 6 phr. of additive having similar composition to that of Example III. After cure and stain aging test for 46 hours at 250° F. the film reflectance value is 69.5% that of the freshly prepared (unaged) sample.

Approximately the same results are obtained with film samples prepared with a resin formulation using instead of the vinyl chloride homopolymer a vinyl chloride-vinyl acetate (95%–5% respectively) copolymer.

Obviously, many modifications and variations of the invention as hereinbefore set forth may be made without departing from the spirit and scope thereof, and therefore only such limitations should be imposed as are indicated in the appended claims.

What is claimed is:

1. A vinyl chloride resin composition stable to heat and light when in contact with amine-catalyzed polyurethane, said composition comprising 2 to 10 parts of a stabilizer additive per hundred parts of vinyl chloride resin, said stabilizer additive comprising
   from about 0.5 to 3 parts of phosphite esters, said esters containing organic groups selected from aryl, alkyl and alkaryl groups of 4 to 18 carbon atoms,
   from about 0.5 to 5.5 parts of alkaline earth metal and zinc salts of acids selected from inorganic acids, monocarboxylic normal alkanoic acids having not more than 18 carbon atoms, and phenol,
   from about 0.2 to about 2 parts of an organic hydroxy compound selected from 2,6-di-t-butyl paracresol, 4,4-methylene bis-(2,6-di-t-butyl phenol), 2,2-bis-(p-hydroxyphenyl) propane, and bis-(3,5-di-iso-propyl-4-hydroxyphenyl) methane, and
   at least 0.1 part of a dialkyl thiodipropionate in which the alkyl group has at least 12 carbon atoms in the alkyl chain, each per hundred parts of resin.

2. Compositions as defined in claim 1 wherein the alkaline earth metal salt concentration is not more than 3 parts per hundred parts of resin.

3. Compositions as defined in claim 1 wherein the phosphite esters are selected from the group consisting of triphenyl phosphite, tri-(p-tertiary butyl phenyl) phosphite, diphenyl monobutyl phosphite, phenyl dioctyl phosphite, trioctyl phosphite, and diphenyl n-decyl phosphite.

4. Composition as defined in claim 1 wherein said alkaline earth and zinc components are present in the form of salts of higher fatty acids.

References Cited

UNITED STATES PATENTS 3,144,422  8/1964  Homberg _____ 260—23
3,225,001  12/1965  Darsa _____ 260—45.75

DONALD E. CZAJA, Primary Examiner

R. A. WHITE, Assistant Examiner

U.S. Cl. X.R.

260—45.7, 45.75, 45.85, 45.95